United States Patent [19]

Goldman et al.

[11] E Patent Number: Re. 32,589

[45] Reissued Date of Patent: Feb. 2, 1988

[54] MOBILE OFFSHORE, SELF-ELEVATING (JACK-UP) UNIT LEG/HULL RIGIDIFICATION SYSTEM

[75] Inventors: Jerome L. Goldman; Walter H. Michel; John O. 'R. Breeden, all of New Orleans, La.

[73] Assignee: Friede & Goldman, Ltd., New Orleans, La.

[21] Appl. No.: 498,574

[22] Filed: May 26, 1983

Related U.S. Patent Documents

Reissue of:

[64] Patent No.: 4,269,543
Issued: May 26, 1981
Appl. No.: 70,672
Filed: Aug. 29, 1979

[51] Int. Cl.[4] ..... E21B 7/12

[52] U.S. Cl. ..... 405/198; 254/89 R; 254/95

[58] Field of Search ..... 405/196–200; 254/89 R, 95

[56] References Cited

U.S. PATENT DOCUMENTS

| | | | |
|---|---|---|---|
| 2,589,146 | 3/1952 | Samuelson | 405/208 |
| 3,343,371 | 9/1967 | Heitkamp | 405/198 |
| 4,160,538 | 7/1979 | Armstrong | 254/95 |
| 4,203,576 | 5/1980 | Sutton | 254/95 |
| 4,255,069 | 3/1981 | Yielding | 405/196 |

*Primary Examiner*—David H. Corbin
*Attorney, Agent, or Firm*—Keaty & Keaty

[57] ABSTRACT

A system for making a "jack-up" rig with its jacked-up legs and hull rigid and fixed together by the use of "rack chock" elements which are designed to absorb the maximum axial chord loading on the legs and transmit them directly into the hull. The "rack chock" elements are configured preferrably with a number of matching teeth for exact, in-line engagement with the legs' rack teeth, and are capable of being adjusted for vertical alignment and horizontal positioning to mate with the rack teeth position. By a series of screw jacks and/or secondary chocks, the "rack chock" elements provide rigid contact with both the legs and the hull structure and eliminate the requirement for the jack pinions to take the load (as is done in the prior art) in either jacked-up or ocean-tow dispositions.

12 Claims, 24 Drawing Figures

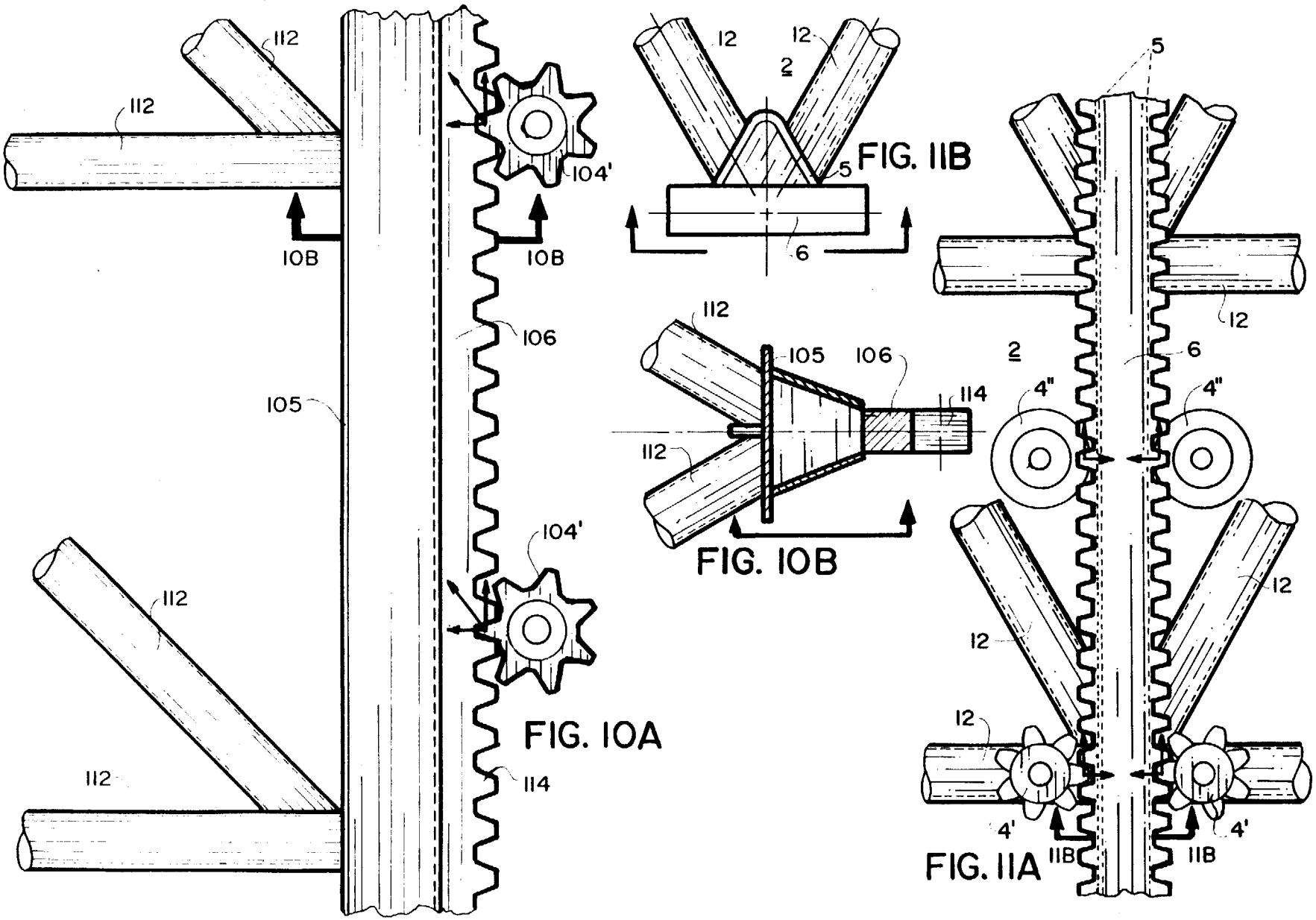
FIG. IIA
FIG. IIB
FIG. IOB
FIG. IOA
2
4"
4'
5
6
12
11B
114
106
105
112
10B
104'

MOBILE OFFSHORE, SELF-ELEVATING (JACK-UP) UNIT LEG/HULL RIGIDIFICATION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to mobile, offshore self-elevating "jack-up units" or rigs for offshore oil work and more particularly to a system for making such a unit with its support legs rigid and fixed, when the legs are either up or down in a desired position, counteracting the major loads which these units must accomodate, namely fixed weights, variable weights, wind, currents and waves.

A "jack-up unit" as used herein means any working platform used for drilling, work over, production, crane work, compressor stations, diving support or other offshore purpose in an elevated position above the water, and being supported on jackable legs to the ocean floor or other water bottom, with the inherent capability of relocating from one site to another by lowering to a floating position, and, after being moved to a new, established location, raising again to an elevated position.

The present invention is intended to apply to any jack-up rig unit which is raised or lowered with a jacking apparatus, a typical example of which is disclosed in U.S. Pat. No. 3,606,251, or other pinion driven systems, that engage rack teeth on the legs.

2. Prior Art

Jack-up units equipped with rack and pinion type jacking systems have long been known as shown, for example, in U.S. Pat. Nos. 2,308,743 issued Jan. 19, 1943 to W. P. Bulkey et al; 3,183,676 issued May 18, 1965 to R. G. LeTourneau; and 3,606,251 originally issued Sep. 20, 1971 and reissued as U.S. Pat. No. 29,539 on Feb. 14 1978 and owned by the Armco Steel Corporation. These units use the pinions to transfer the loads from the hull into the leg chords and vise versa, in conjunction with a guidance system required to take amounts due to wind, waves or other imposed loadings. The pinion supported units of U.S. Pat. No. 3,183,676, impose a horizontal component of the load transfer, due to the tooth pressure angle that directly imposes a moment in the leg chords. The units supported by the pinions in conjunction with a guidance system, have an inherent flexibility in the pinion gear train system that further introduces a moment in the leg chords through their guidance system.

To overcome this problem the present invention uses rack engaging members that engage, interdigitate and lock into preferably a number of the rack teeth of each leg. The "rack chock" horizontal contact with the leg chord rack bar is maintained by additional chocks, screws, wedges, etc., and the "rack chord" leg sections may be of numerous types.

Typical examples of some prior patents which show some form [of] *or* other of leg teeth engaging device in jack-up units are presented below.

| Inventor(s) | Patent No. | Issue Date |
|---|---|---|
| S. Lewis | 103,899 | June 7, 1870 |
| B. Laffaille | 2,540,679 | Feb. 6, 1951 |
| C. A. D. Bayley | 2,862,738 | Dec. 2, 1958 |
| A. I. Guy, et al | 2,954,676 | Oct. 4, 1960 |
| G. E. Suderow | 3,007,317 | Nov. 7, 1961 |
| L. J. Roussel | 3,109,289 | Nov. 5, 1963 |
| J. L. Roussel | 3,717,259 | March 2, 1965 |
| R. D. Yeilding | 3,290,007 | Dec. 6, 1966 |
| Itoh, et al | 3,722,863 | March 27, 1973 |
| Lucas | 3,876,181 | April 8, 1975 |
| James Humby, et al | Great Britain 934,369 | August 21, 1963 |

However, these patents do not fairly teach or suggest the present invention and are clearly distinguishable from the over-all rigidification system of the present invention.

3. Discussion of Forces Involved and Prior Art Systems

The present invention does not introduce any large secondary bending stresses than can limit the performance of the jack-up unit.

The graph, FIG. 8, "Operational Analysis—Variation of Stress Components in Critical Member", identifies the influence on leg stress when the "jack tower guides" of the prior art are used to take the leg moments. This method is used for most if not all existing designs, either entirely or in part to handle the leg moments. The dotted lines represent the leg axial stress that the system of the present invention absorbs directly; while the solid line represents the additional secondary bending stress due to the use of a "jack-tower" guide system.

Other prior designs use a rack and pinion system that has its line of support directed radially from the center of the leg. Due to the rack and pinion pressure angle, the leg receives a secondary bending load of approximately forty (40%) percent of the vertical loads.

These secondary bending stresses can be larger than the axial stress and have limited the potential for prior art jack-up units for going in to deeper waters and high wave sites.

To illustrate the basic development of forces and moments at the leg/hull interface, the simplified two-dimensional structural bent, as representing a typical leg/-hull structure under environmental and weight loadings, illustrated in FIGS. 9A and 9B should be considered.

From the force pictures of FIGS. 9A and 9B the forces applied to that section of leg within or adjacent to the hull structure may be determined (taken above the wave zone, and for the more highly loaded leeward leg).

The forces in the leg just below the hull are seen with reference to FIG. 9B, to be directed almost entirely as axial loading in the chords, except for the nominal shear loading due to wind taken in the bracing. How these forces are taken in the hull depends primarily on the jack attachment as outlined below.

A. Resilient mounted jacks will deflect under load so that the leg will tend to rotate due to the overturning moment, and the guides will be required to resist some of this moment as a horizontal couple. In the extreme, with deep rubber pads that may deflect several inches or so, the jacks (pinions) will take only the vertical load imposed by the hull, $\frac{1}{2}(W/2+M/1)$, with the guides bearing all of the forces due to the moment, plus the wind shear. Thus, considerable stress must be borne by the bracings through this area, and in addition, the chords may be subject to large bending stresses (in additional to compression), particularly if the guides are at mid-bay.

As a result, not only is the leg extremely heavy, but the jack towers supporting the upper guides must also be substantial to carry the upper reaction load into the hull.

B. Jack fixed to the hull will tend to absorb directly almost all of the axial loading of the chords, including that due to the vertical couple of the overturning moment. Due to some torsional deflection of the pinion gear train (which is small) and the stiffness of the bracing (again which is small, relative to the chords), there will be some transfer of overturning moment as a horizontal couple at the guides. Generally, this will be small, and even with the addition of the horizontal wind shear, the bracing size will remain nominal (except where single pinion racks are used; see item 3 below).

However, since the jacks will take almost the entire loading of overturning in addition to the hull weight, it is probable that for severe environmental conditions, the number of pinions required will be greater than that needed for the sole purpose of jacking up or down. Pinion ratings for holding loads (with brakes set) are generally twice that permitted for normal jacking, and thus the load due to overturning would be limited to the same as that due to weight support, or additional pinions would be required.

C. Single Pinion Racks and Opposed Pinion Racks

Where rack/pinion arrangements provide only a one-sided rack with a sinle vertical line of pinions (note FIGS. 10A and 10B), such as for example is the case in the "Le Tourneau" type-rigs (a majority of all-present jack-up rigs), there is a large component of the pinion force directed horizontally that must be transmitted throuh the chord and bracing structure into the racking on the opposite chord. With the pressure angle of the rack teeth of 20 to 25 degrees being typical (note FIG. 10A), this horizontal force is of the order of 40% of the vertical force needed for rig support. This results in high bending stresses in the chords and high compressive stresses in the bracing, resulting again in an extremely heavy leg being required (whether the jacks are floating or fixed to the hull).

With opposed pinion racks (note FIGS. 11A and 11B), such as for example is the case in the "National type rigs (approximately 10% of all present jack-up rigs), the horizontal forces are directly taken through the individual rack in compression (normal to the vertical compression and readily absorbed) and there is no input into the leg assembly.

The horizontal forces which increase the leg chord and bracing weight also require large size members for larger loads. These increases in turn incur larger wave[r] loadings and then larger horizontal forces, etc. This "domino" effect has caused limitations on the capability of this prior art design unit.

The present invention outlined herein will eliminate the induced horizontal forces.

In the present invention, in for example the embodiment as developed for use with opposed racks (FIGS. 2–4), each of the "rack chock" elements of the system of the present invention is designed to absorb the maximum axial chord loading and transmit it directly into the hull. It is configured with preferrably a number of matching teeth for exact, in-line engagement with the legs' rack teeth, and is capable of being adjusted for vertical engagement to mate with the rack teeth position. By a series of screw jacks and/or secondary chocks, it will provide rigid contact with both the legs and the hull structure, and will eliminate the requirement for the jack pinions to take load, as is done in the prior art, in either jacked-up or ocean-tow dispositions.

Among the major advantages of the present invention are the following:

a. The legs will be of minimum scantling and weight, consistent with the design loads and environmental conditions, which, in addition to cost reduction, will provide greater capability under ocean tow conditions with legs raised and subject to roll dynamics.

b. There will be no need to provide additional pinions to take environmental loadings (for the case of jacks fixed to the hull). The jacks can be selected just for the service requirements of jacking up and down.

c. Pinions and their gear trains will not be subject to oscillating loads which cause wear and fatigue damage. This is of particular significance when under tow with high dynamic reversals of load.

d. With the rack chocks fully engaged in final position, complete jack assemblies may be removed for overhaul or replacement, or for use on another installation.

4. General Summary Discussion of Invention and Its Application

For purposes of this general discussion of the present invention, the legs of the rig are considered to be of the truss type, each leg having three or more chords and each chord incorporating, for example, a dual rack section having two opposed sets of rack teeth, each extending along one of the two edges of the rack bar. However, the present invention is applicable to legs of any structural form having any multiplicity of single or dual rack sections.

The present invention provides an improved method of rigidly supporting the "jack-up unit" in an elevated position on the legs of the unit, and/or of rigidly supporting the legs in a raised position when the unit is in an afloat disposition. In the invention the dual rack section is engaged with opposed, matching rack sections, which can be fixed to the unit. In the preferred embodiment, each matching rack section, called a "rack chock", can be adjusted vertically up and down along the legchord dual rack section and horizontally in and out to engage or disengage the leg chord dual rack section.

The "rack chock" of the rigidification system of the present invention transfers the loads from the hull into the leg chords or from the leg chords back into the hull. The "rack chock" elements accomplish at least in part this load transfer, and eliminate the introduction of moments in the leg chords which would otherwise occur due to the guidance system, or due to pinion reactions in the jacking systems.

In the invention, the load transfer can be either through the "rack chocks" only or jointly with the pinions as desired.

The "rack chock" elements of the present invention utilize the necessary number of in-line tooth engagements to safely transfer the load and can have metalized tooth surfaces to distribute the load across the teeth evenly.

The "rack chock" elements can be engaged with the leg chord rack bar, pre-loaded to eliminate movement in the contacting tooth surfaces.

The "rack chock" elements of ridification system can be moved vertically by mechanical or hydraulic means, such as for example, cylinders, screws, wedges, etc. The vertical positioning permits the indexing of the "rack chock" teeth with the leg chord rack bar teeth.

Each "rack chock" element can be fixed to the hull structure, after vertical positioning, by chocks, screws, wedges, etc. Fixing to the hull can be accomplished both above and below the "rack chock".

The horizontal movement to engage or disengage each of the "rack chock" elements with its respective leg chord rack can be by mechanical or hydraulic means, such as for example cylinders, screws, wedges, etc.

The "rack chock" horizontal contact with the leg chord rack bar is maintained by chock, screws, wedges, etc. and the "rack chord" leg sections may be of any numerous types.

With the use of the ridification system of the present invention the jacking systems are no longer needed to lock the legs in position and can be removed for use elsewhere, enhancing the economics of the invention. Additionally, with the availability of the present invention on a rig, it is estimated that perhaps as much as one thousand tons of steel can be saved in the fabrication of the rig. Also, with the present invention, it is believed that jack-up rigs will now have an extended range with respect to water and wave depths twice that it was before the present invention.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIGS. 1A and 1B are perspective and side views of an exemplary jack-up rig to which the present invention can be applied and includes schematic representation of the force loadings on the rig legs; while

FIG. 2 is a partial, close-up, side view of one of the rig legs showing the relative positions with respect to the leg of the hull and leg jacking drive and the "rack chock" elements of the first, preferred embodiment of the present invention as applied to a leg of the double, opposed pinion rack or "National" type of rig; while

FIG. 5 is a partial, close-up, side view, similar to FIG. 2, but of a second, preferred embodiment of the present invention as applied to a leg of the single, end loaded or "Le Tourneau" rack type of rig; while

FIG. 9A is a side, schematic view of a simplified, two-dimensional structural bent, as representing a typical leg/hull structure under environmental and weight loadings, to illustrate the basic development of forces and moments at the leg/hull interface; while

FIG. 10A is a side, partial view of a support leg of the single, pinion rack type for a "La Tourneau" type rig showing the angled force interfacing between the teeth of the jacking pinions and the simple row of rack teeth at each chord of the leg; while FIG. 10B is a plan view of the elements of FIG. 10A.

FIG. 11A is a side, partial view of a typical support leg of the double, opposed rack type for a "Natural" type rig showing the angled force interfacing between the teeth of the jacking pinions and the double, opposed rows of the rack teeth at each chord of the leg; while FIG. 11B is a plan view of the elements of FIG. 11A.

DETAILED DESCRIPTION OF THE PREFERRED EMBODIMENTS

Leg Load Analysis

Figure 1A:
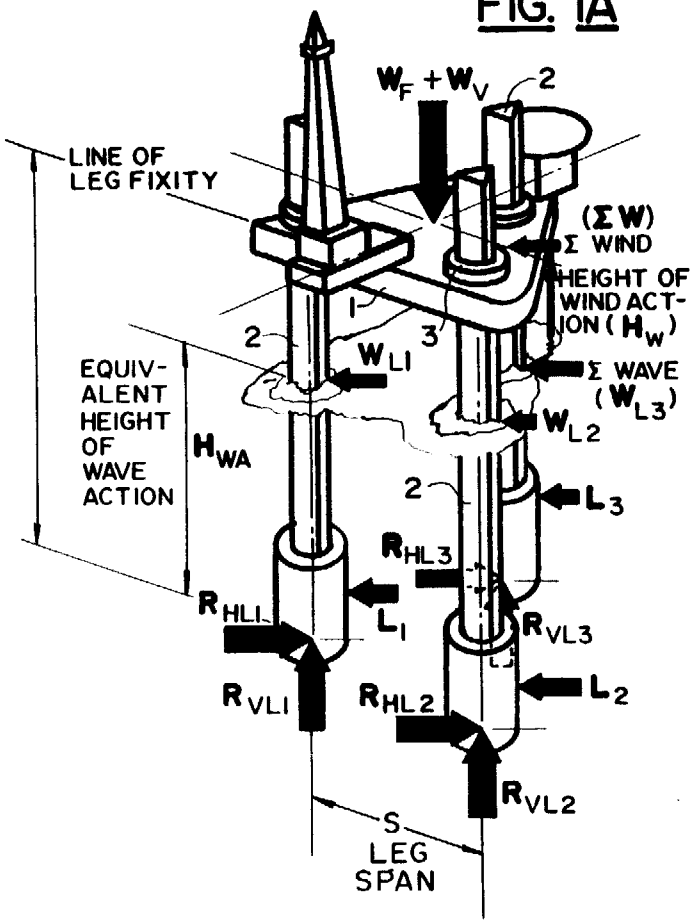
Figure 1C:
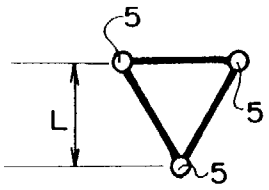
FIG. 1C is a schematic representation of a leg cord.
Figure 1B:
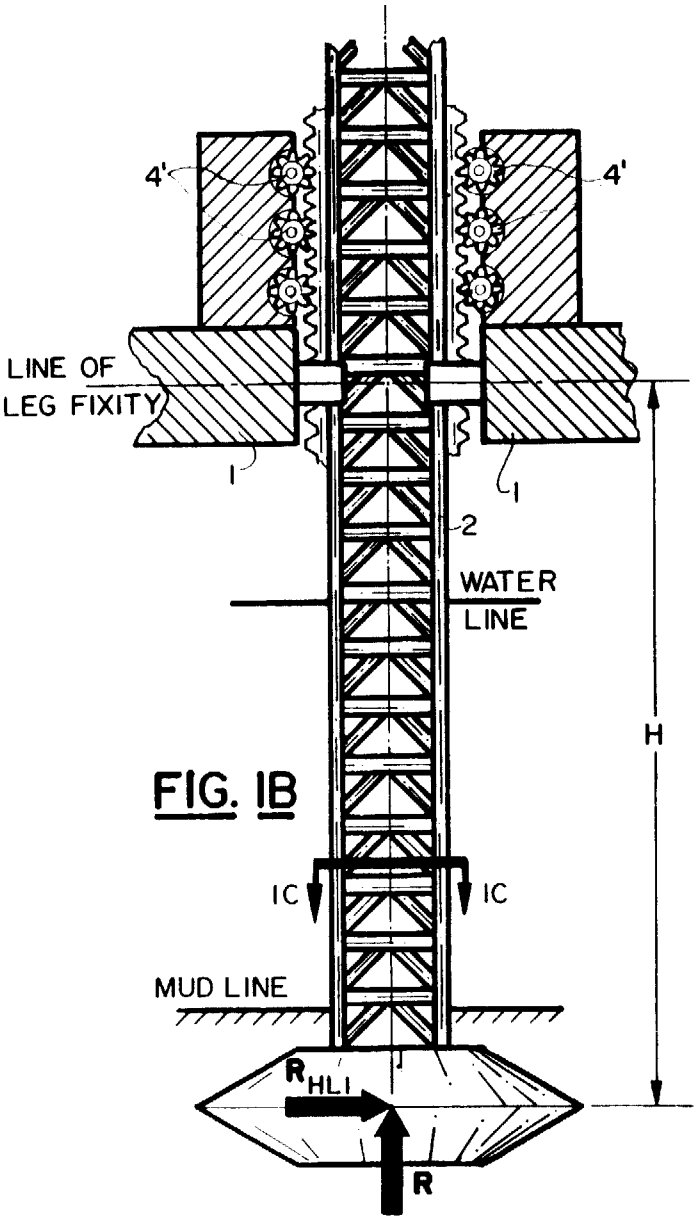
Figure 9A:
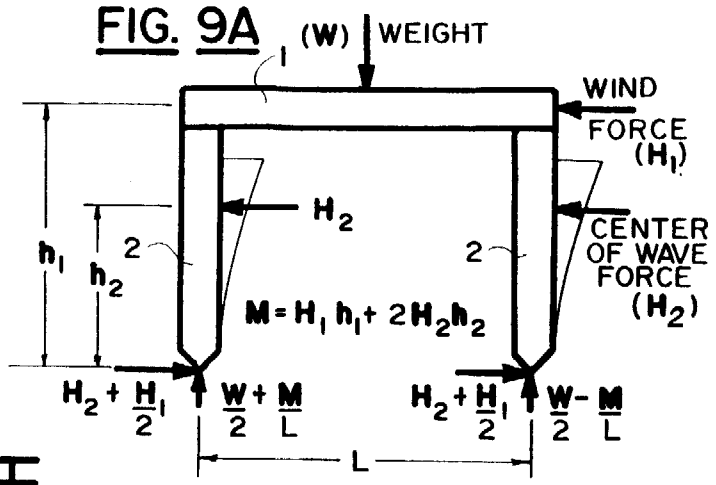
Figure 9B:
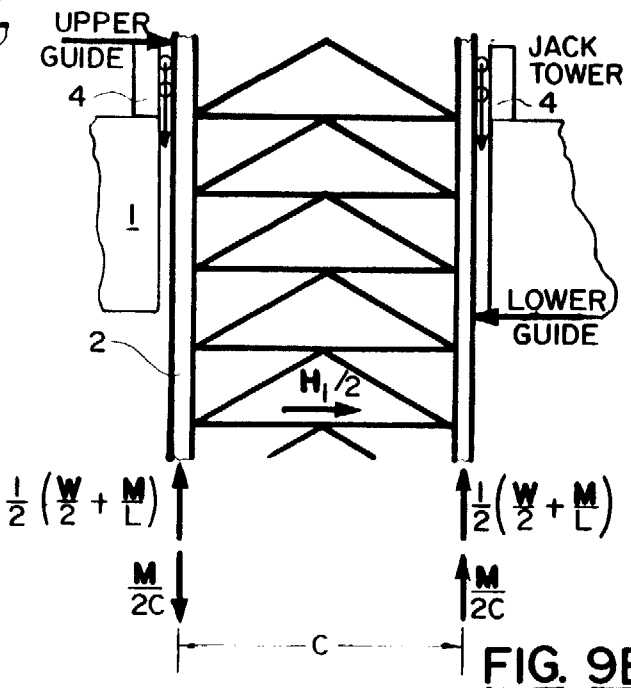
FIG. 9B is a close-up, partial view of the structural bent of the schematic view of FIG. 9A, showing in detail the forces at the leg/hull interface.

FIGS. 1A–1C are generalized sketches and are provided for making a simplified leg load analysis for a better understanding of the purpose, operation and effect achieved by the use of the preferred embodiments of the present invention. FIG. 1A is not intended to be of any specific unit and the number of legs could be three or more. The legs 2 considered are for illustrative purposes of the trussed type made with three or more chords.

With reference to the standard engineering symbols and abreviations used in FIG. 1A and 1B and assuming that the fixed weights ($W_f$) and the variable weights ($W_v$) are evenly distributed with each leg taking one-third of the $W_f$ and $W_v$, the overturning moment (OT) is computed as follows:

$$OT=(\Sigma W \cdot Hw)+(W_{L1}+W_{L2}+W_{L3})\times H_{wa}$$

while each of the leg loads (L1–L3)—horizontal ($R_H$) are computed by:

$$RHL1=W_{L1}+\tfrac{1}{3}\Sigma W$$

$$RHL2=W_{L2}+\tfrac{1}{3}\Sigma W$$

$$RHL3=W_{L3}+\tfrac{1}{3}\Sigma W$$

and the leg loads—vertical (RV) are:

$$RVL1=\tfrac{1}{3}(W_f+W_v)[=OT/s]\ +OT/S$$

$$RVL2=\tfrac{1}{3}(W_f+W_v)-[OT/S]\ -OT/2s$$

$$RVL3+\tfrac{1}{3}(W[_2]_f+W_v)-OT/2S$$

As can be seen from the foregoing, the leeward leg [(11)] *L1* receives the highest loading, and will be examined further. The legs are like cantilevers with fixity in the hull 1 and pin joints below the mud line (note FIG. 1B).

$$\text{No. } 1 = \tfrac{1}{3}R_{VL1} - (RHL1 \times H) \div L$$

$$\text{No. } 2 = \tfrac{1}{3}R_{VL1} + \tfrac{1}{2}(RHL1 \times H) \div L$$

$$\text{No. } 3 = \tfrac{1}{3}R_{VL1} + \tfrac{1}{2}(RHL1 \times H) \div L$$

The chord loads are essentially tension or compression. The horizontal or shear loads are taken by the bracings. These loads for typical drilling units like the Friede & Goldman, [Inc.] *Ltd.* L-780, Le Tourneau 82, or 116 will be in the following range for 200 feet of water:

$W_f$—8,000 to 10,000 kips $W_v$—1,000 to 5,000 kips OT—200,000 to 300,000 foot kips W—400 to 600 kips $W_{L1,\,2\,or\,3}$—60 to 150 kips A leg with a chord span (L) of 30 feet would have a chord load of (using minimum values):

$$= \tfrac{1}{3}\,R_{VL1} + \tfrac{1}{2}(R_{HL1} \times H) \div L$$

$$= \tfrac{1}{3} \times \tfrac{1}{3}(9000) + \frac{200{,}000}{100} + [\tfrac{1}{2}2(60 + 400/3) \times 265] \div 30$$

$$= 1000 + 2000 + 854 = 3854 \text{ Kips}$$

With a chord area of 100 sq. in., the stress would be 38.5 ksi. Using maximum values:

$$= \tfrac{1}{3} \times \tfrac{1}{3}(15{,}000) + \frac{300{,}000}{100} + [\tfrac{1}{2}(150 + 600/3) \times 265] \div 30$$

$$= 1667 + 3000 - 1546 = 6212 \text{ Kips}$$

With a chord area of 130 sq. in., the stress would be 48.7 ksi.

Larger units would have greater dead loads, wind loads, wave loads, etc. The units would have leg spacings of 200 feet in lieu of 100 feet and chord spacings of 50 feet in lieu of 30 feet. Chord areas would be in the 350 to 400 sq. in. range.

The approach of the present invention to the leg design is to absorb these leg chord stresses directly into the hull 1. In order to accomplish this, the support system of the present invention utilizes a "Rack Chock" System as shown in the two embodiments of FIGS. 2–4 and 5–7 and described more fully below, as well as in the third embodiment of FIG. 14. The rack chocks, of the double, opposed type embodiments of FIGS. 2–4 and FIG. 14 will not introduce any appreciable horizontal loads or moments into the legs.

1st Embodiment/Double Opposed Pinion Rack

Figure 2:
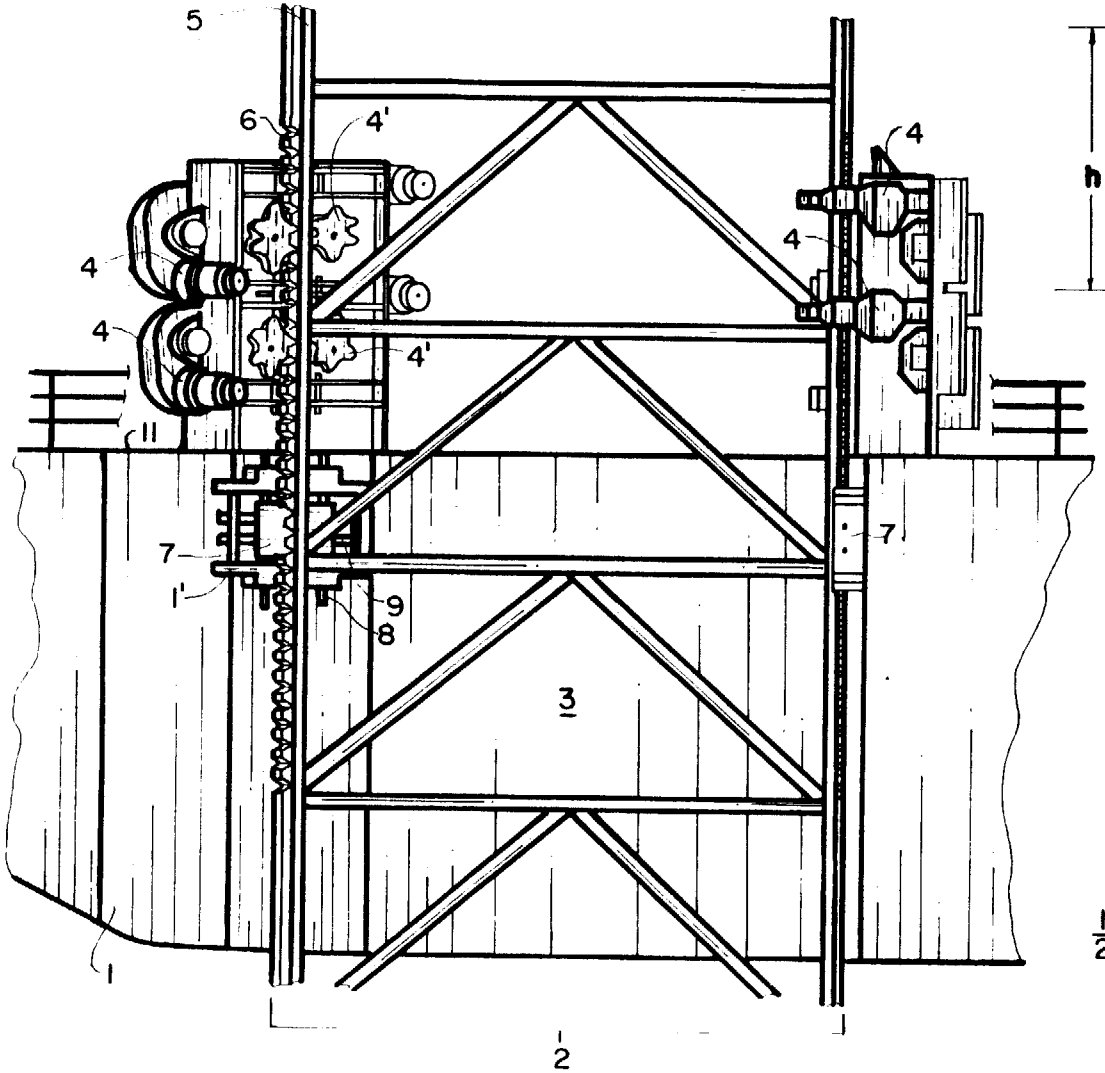
Figure 3:
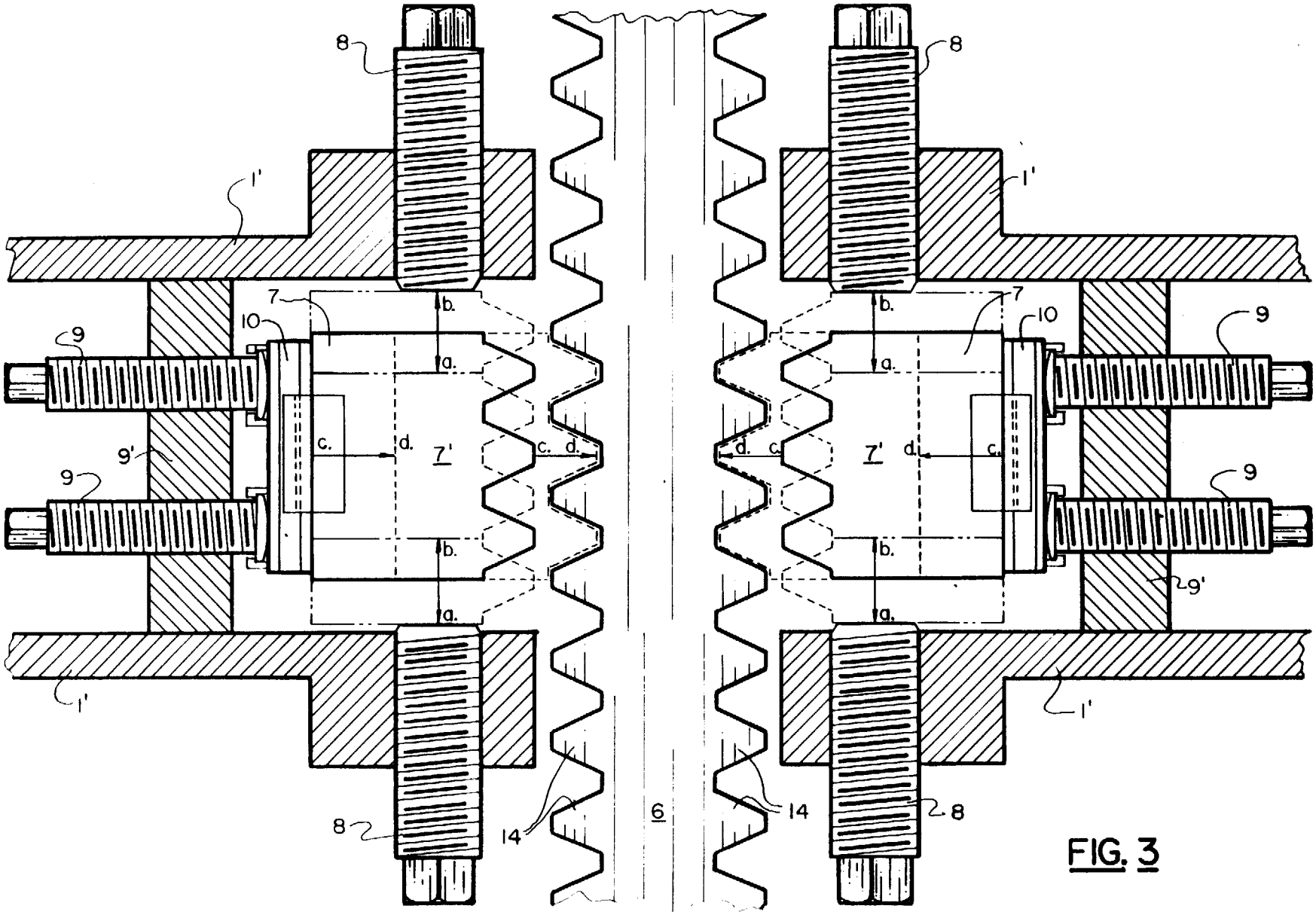
FIG. 3 is a still further close-up, side view showing in further detail the "rack chock" element of the embodiment of FIG. 2.
Figure 4:
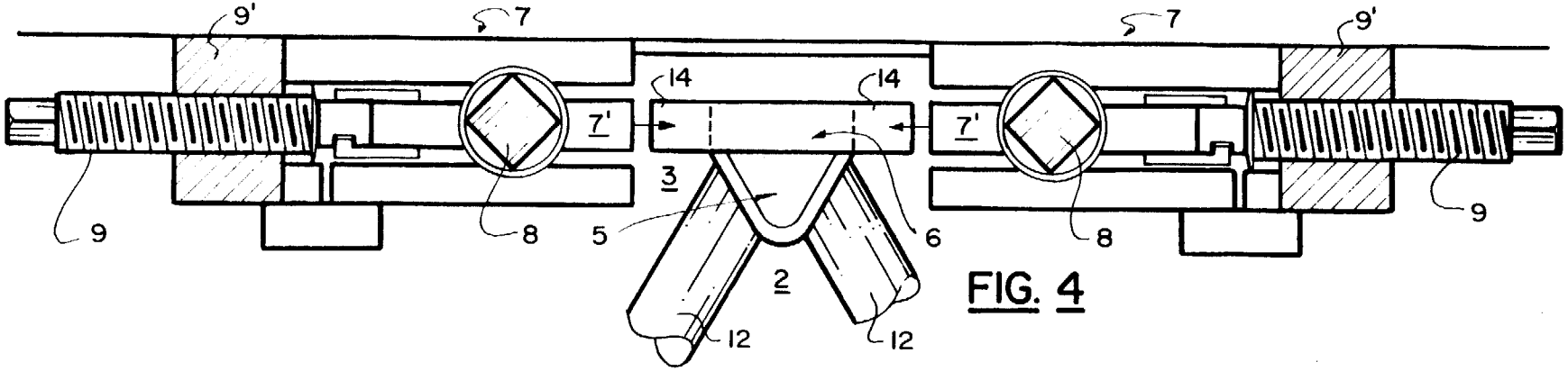
FIG. 4 is a top view of the element of FIG. 3.

A first preferred embodiment of the present invention as applied to a double, opposed, pinion rack type jacking leg system, for example of the National Supply type (note FIGS. 11A and 11B) is illustrated in detail in FIGS. 2–4.

FIG. 1A shows an arrangement of an exemplary "jack-up" unit. Hull 1 supports all of the machinery, quarters, outfit, etc. The hull 1 in this illustrated unit is raised by three legs 2, which are located in leg wells 3 forming openings in the hull 1.

In FIGS. 1A and 1B, the hull 1 is shown raised above the water level and supported by the legs 2. The raising and lowering is accomplished by the jacks 4' driving pinions 4 illustrated in FIGS. 1B and 2 and which can be, for example, a "National Supply" type jack, U.S. Pat. No. 3,606,251 discloses in some detail the particulars of a typical jack arrangement which could be used.

The legs 2 shown have three chords 5 (note FIG. 1C). As best shown in FIGS. 2, 11A and 11B, each chord 5 incorporates a rack plate 6, which the jack pinions 4 engage to raise or lower the "jack-up unit" hull on the legs 2.

When the hull 1 is elevated to the proper position, the "rack chocks" 7 of the present invention are then engaged. Each "rack chock" 7 can be located within the hull leg wells 3 above the hull 1. Two laterally opposed "rack chocks" 7 (note FIG. 3) are used with each leg chord rack 6 to equalize the horizontal forces due to the rack tooth pressure angle.

The elevated position of the hull 1 is variable and is not absolutely predetermined. The "rack chock" 7 is raised or lowered vertically (note FIG. 3) by [screw] *screws* 8 which threadably engage and ride in hull support substructure 1' (from phantom line position "a" to phantom line position "b"). The operation of the screws 8 can, for example, be manual or actuated with a pneumatic powered wrench or by other suitable means.

When each "rack chock" 7 has been visually aligned with its respective leg chord rack 6, then the "rack chock" 7 is moved horizontally (from phantom line position "c" to phantom line position "d" of FIG. 3), into contact with the leg chord rack 6 by turning the horizontal engaging screws 9' which threadably engage and ride in screw support member 9 fixed to the hull support members 1 which in turn are structurally and rigidly fixed to the hull structure 1' itself. "Rack chocks" 7 and the teeth 14 of the leg chord rack plate 6 is established, then each elevating screw 8 is backed out approximately one turn so as not engage the "rack chock" 7. The horizontal engaging screws 9 are then alternately pretorqued to a predetermined desired amount. The upper and lower elevating screws 8 are then brought into contact with their "rack chock" 7 and alternately pretorqued to a predetermined amount.

The load may then be totally transferred from the jacks 4 to the "rack chocks" 7 by releasing the jack brakes. Preferably, as shown best in FIG. 3, each teeth engaging chock element 7 includes a multiple number of matching teeth to interdigitate and mate with the teeth 14 of the rack 6, an exemplary number of three being shown, although one simple tooth is possible. As opposed to the rotatably movable tooth engagement of the pinions 4' only partially and intermittently contacting portions of the two adjacent teeth 14 of the rack 6 (note FIG. 11A), the teeth of the contacting chock element 7 rigidly and fixedly engages in full, face-to-face, in-line engagement at least two adjacent teeth 14, or, in the embodiment of FIG. 3, four teeth 14, two of the four being lockably engaged on both sides of the teeth of the element 7.

2nd Embodiment/Single End Loaded Rack

Figure 7:
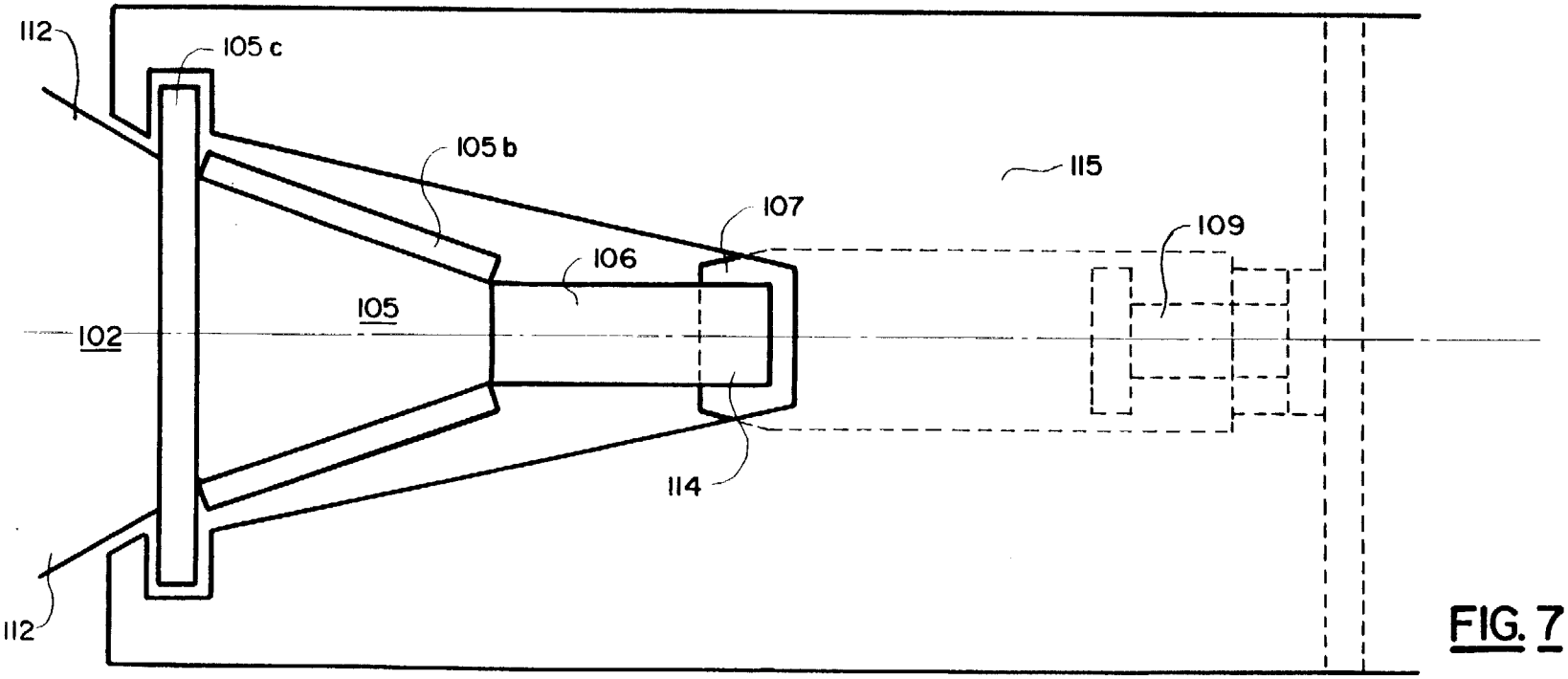
FIG. 7 is a top view of the element of FIG. 6.
Figure 5:
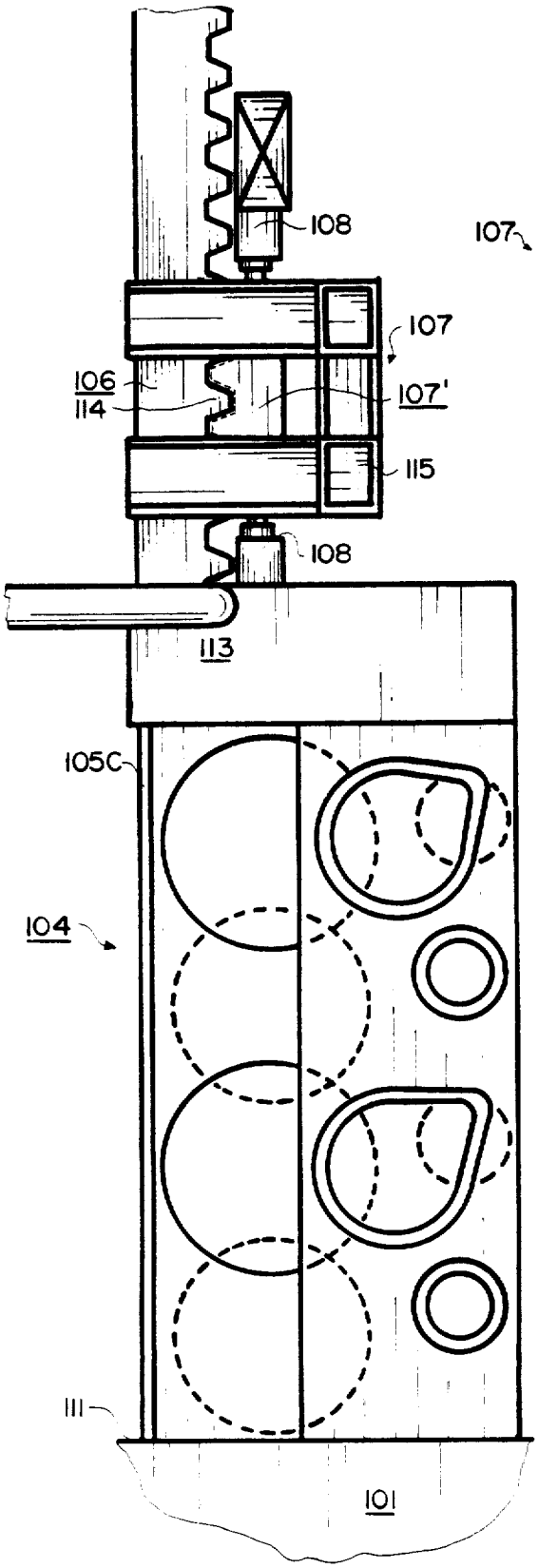
Figure 6:
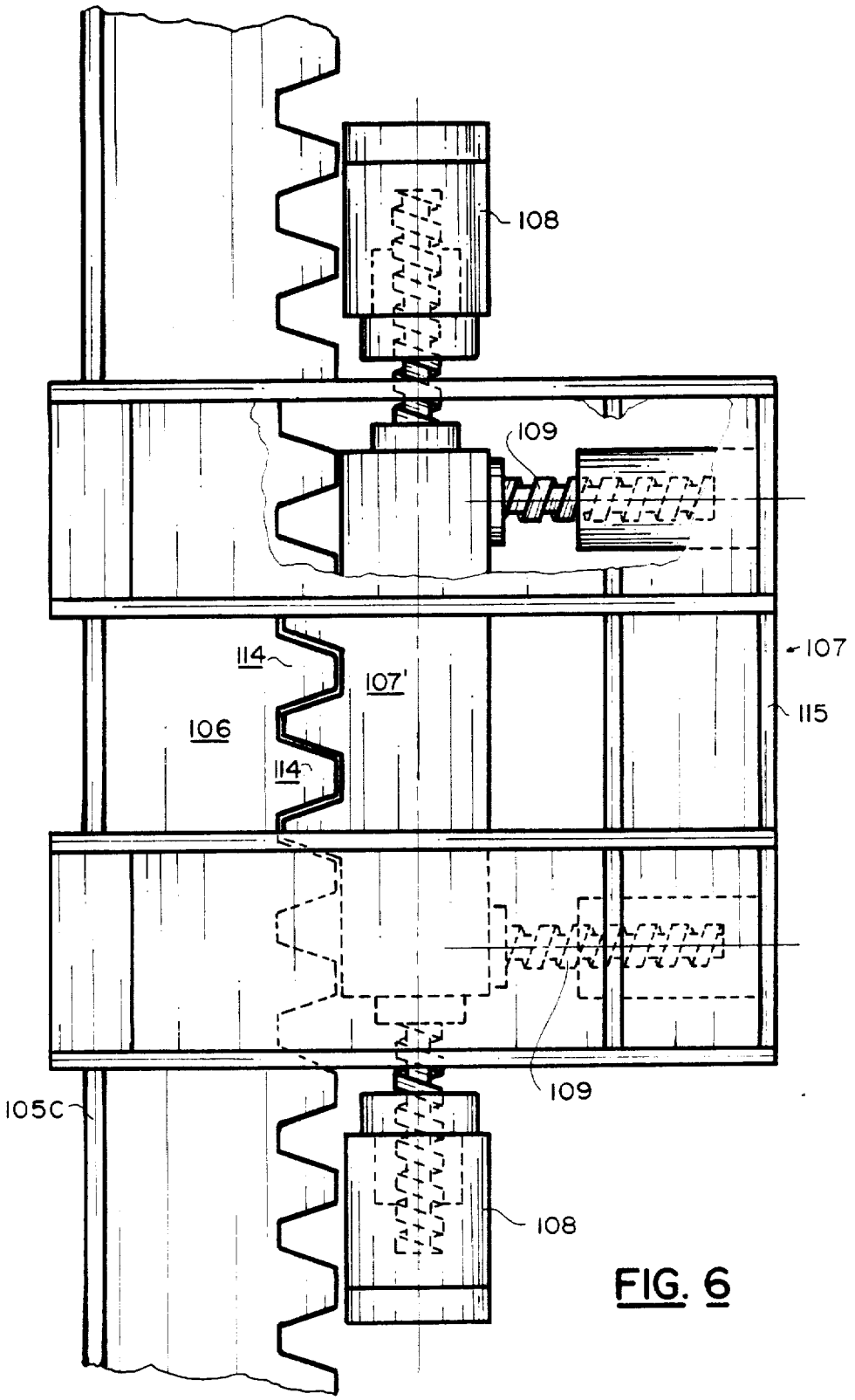
FIG. 6 is a still further close-up, side view showing in further detail the "rack chock" element of the embodiment of FIG. 5.
Figure 8:
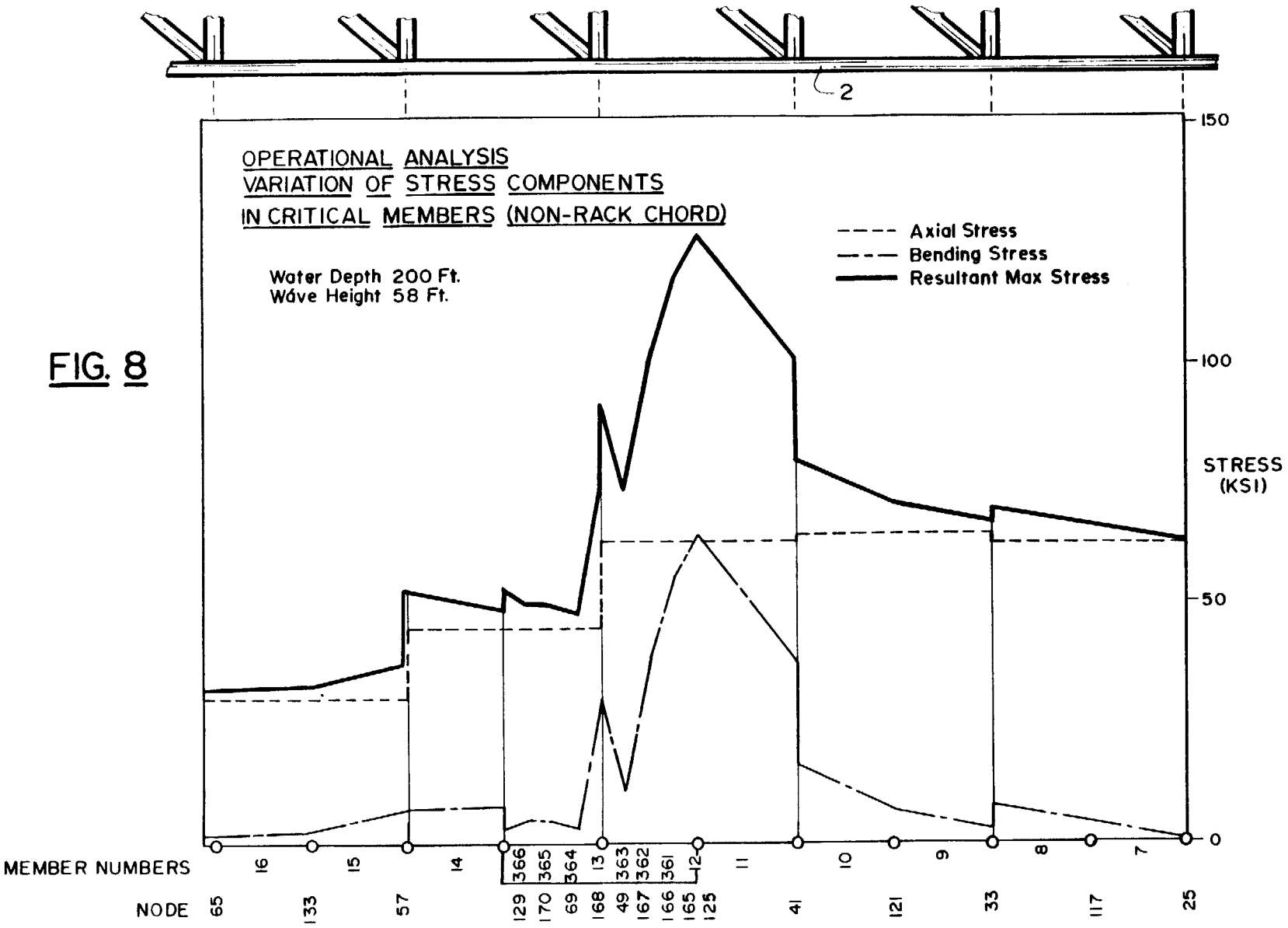
FIG. 8 is a graphical illustration of the operations analysis of the variation of stress components in critical members of a rig such as that illustrated in FIG. 1A.

A second, prepreferred embodiment of the present invention as applied to a single end loaded jacking system, for example of the "Le Tourneau" type (note FIGS. 10A and 10B), is shown in FIGS. 5–7.

The "rack chock" rigidification system of the second embodiment operates similarly to the first embodiment and like reference numbers are used for corresponding elements with, for example, the hull 101 and legs 102 operating in substantially the same manner and way as hull 1 and leg 2, and hence for the sake of brevity the common characteristics and structures between the two will not be repeated in detail here.

Figure 5A:
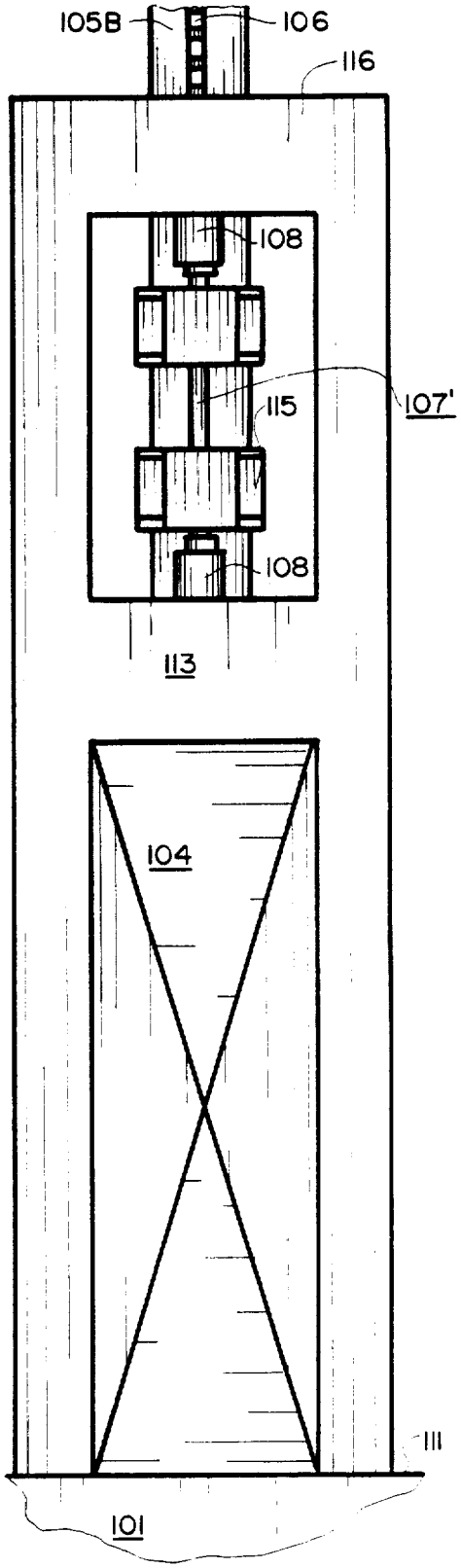
FIG. 5A is an end view of the sub-system of FIG. 5.

As can be seen in FIGS. 5 and 5A, the Le Tourneau type jack 104 is shown as mounted on the deck 111 of the jack-up hull 101. Above the jack unit 104 is a guide structure 113 which engages the back plate 105C of the chord 105.

The rack chock 107 is mounted above the guide structure 113 and is supported by the guide structure 113 by means of the support member 116. The rack chock 107 is thereby supported vertically in an up or down direction depending upon the screw positionings of vertical screws 108. The rack chock 107 engages the rack teeth 114 on the leg 102 so that loads can be transferred from the leg 102 into the rack chock 107, which in turn transfers the loads into the hull 101 of the jack-up unit.

As can best be seen in FIGS. 6 and 7, the rack chock 107 is engaged or disengaged from the rack 106 of the leg 102 by the horizontal screws 109. The rack chock 107 and horizontal screws 109 are guided on the leg chord by a yoke 115. As can best be seen in FIG. 7, the yoke 115 can grip the back plate 105C of the leg chord 105, and, when the rack chock 107 is forced into lateral engagement with the teeth 114 of the rack 106 by the screws 109, the yoke 115 locks into engagement with the back plate 105C, enhancing the rigidification results of the present invention.

The yoke 115 can stay in position above the "Le Tourneau" guides 113 while the leg 102 is being raised or lowered. When the rack chock 107 is engaged with the rack chock teeth 114 on the leg 102, then the vertical jacks 104 can be positioned to take the vertical loads if desired.

Conclusion/3rd Embodiment

The foregoing constitutes two exemplary rack chock embodiments of the system of the present invention as applied to jack-up legs with exemplary double opposed pinion racks and a simple end loaded rack, respectively. However, it should be understood the foregoing has been directed merely to exemplary applications, and the principles of the present invention can be applied to all other types of jack-up units with one or more racks.

Figure 12C:
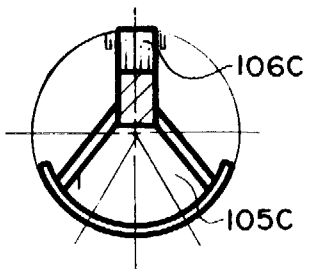
FIGS. 12A, 12B and 12C are plan views of three exemplary types of simple, end loaded racks for legs using a jacking system like the "La Tourneau" type to which the present invention can be applied with FIG. 12B being similar to that of FIG. 10B.
Figure 12B:
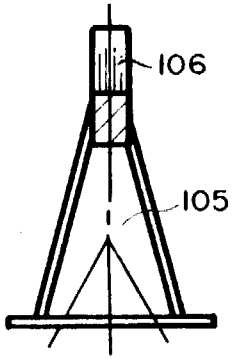
Figure 12A:
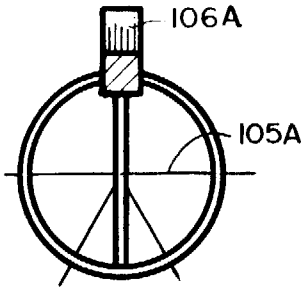

Other exemplary single end loaded rack structures known in the prior art to which the invention could be applied are illustrated in plan views in FIGS. 12A and 12C, each having a leg chord structure 105A, 105C with a single rack 106A, 106C, respectively. FIG. 12B of course illustrates the "Le Tourneau" type structure previously described with reference to FIGS. 5–7 (2nd embodiment) and 10A and 10B. As mentioned above, the single end loaded rack system of FIG. 12B includes a back plate 105C to which the supporting yoke 115 for the rack chock 107 is locked in the engagement of the rack chock 107 with the rack 106. A similar yoke interengagement with the rack structures of the leg chords 105A and 105C could also be designed by either appropriately modifying the yoke structure or the back chord structure or both.

Figure 13C:
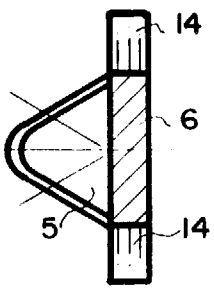
FIGS. 13A, 13B and 13C are plan views of three exemplary types of double opposed pinion racks for legs using a jacking system like the "National Supply" jack, to which the present invention can be applied with FIG. 13B being similar to that of FIG. 11B.
Figure 13B:
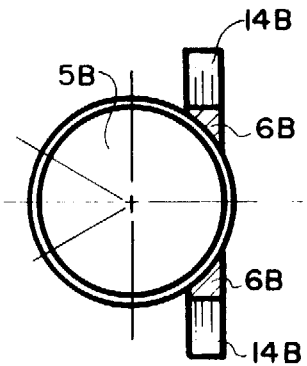
Figure 13A:
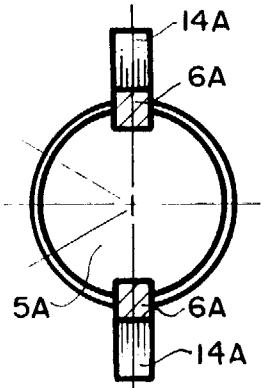

Other exemplary double opposed pinion rack structures known in the prior art to which the invention could be applied are illustrated in plan views in FIGS. 13A and 13B, each having leg chord 5A, 5B with a double rack 6A, 6B, having teeth 14A, 14B, respectively. FIG. 13C of course illustrates the "National Supply" type structure previously described in reference to FIGS. 2–4 (1st embodiment) and 11A and 11B.

Also, it should be understood that the separate, independent vertical (longitudinal) screw system 8, 108 and the horizontal (lateral) screw systems 9, 109, were also merely exemplary. The two degrees of adjustment could be achieved for example simultaneously if desired. Such an alternate rack chock system is illustrated in FIG. 14 as a third, exemplary embodiment.

Figure 14:
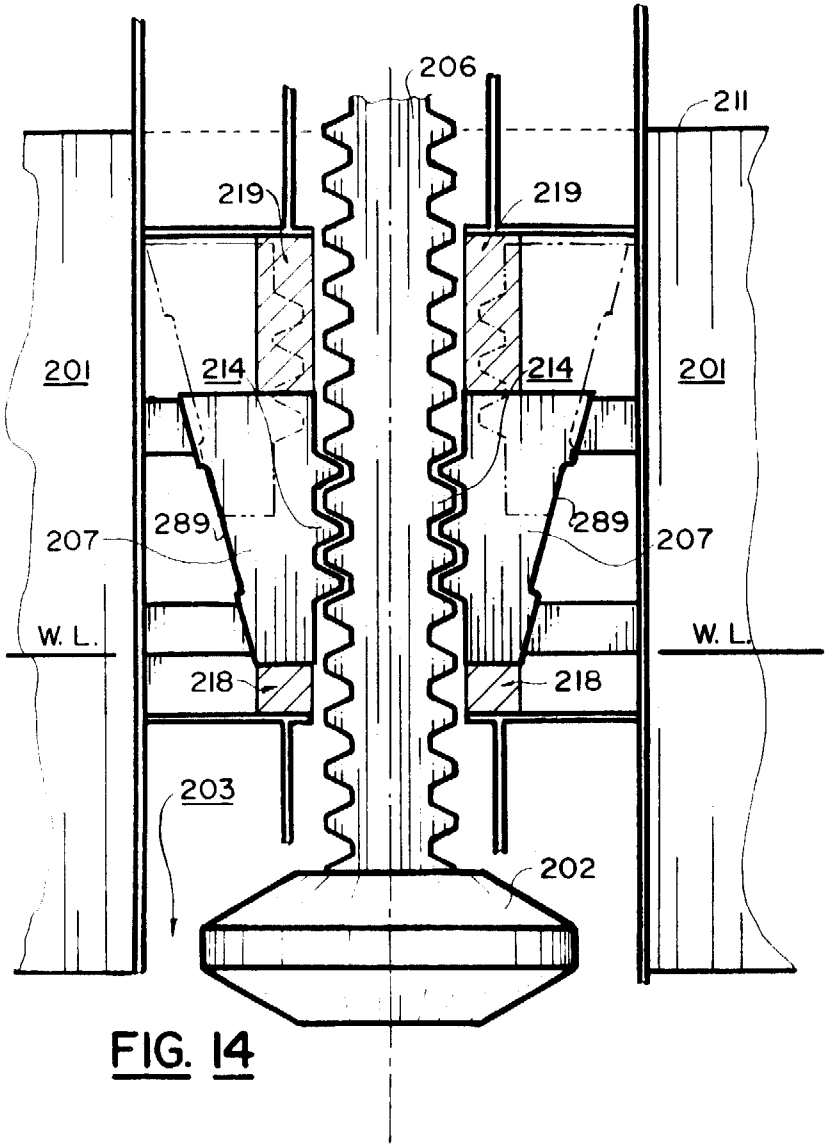
FIG. 14 is a side, partial view of a jack-up rig in the legs-up, floating disposition showing one of the legs with a further, alternate, sliding embodiment of the rack chock, rigidification element of the present invention.

In the embodiment of FIG. 14, the leg 202 shown is in its raised disposition into the leg opening 203 with the jack-up unit hull 201 floating, ready for example for an ocean voyage in being towed from one location to another. The leg 202, which has a double opposed pinion type rack 206, is locked and rigidified into position with the hull 201 by means of the sliding rack chocks 207. The rack chocks 207 were, prior to their rigidifying the legs to the hull, in the upper, phantomed line locations shown in FIG. 14. After each leg 202 was raised to its generally desired, raised position, the chock 207 were allowed to move down against their inclined guide surfaces 289 which simultaneously caused the rack chocks 207 to be moved both longitudinally down and laterally against the rack 206 until the rack chocks 207 at least generally interdigitated with the teeth 214 of the rack 206. The legs 202 were then lowered to the extent needed to jam and lock the rack 206 into the rack chocks 207 against the sides of the guides surfaces 289.

For a long voyage or for added locking rigidity without any need for keeping the jacking pinions engaged or locked, steel plates 218 and 219 are welded into place for a complete and rigid locking of the legs 202 to the hull 201.

It should become apparent that many changes may be made in the various parts of the invention without departing from the spirit and scope of the invention, and the invention and the detailed embodiments are not to be considered limiting but have been shown by illustration only.

Having described several exemplary embodiments of the invention, what is claimed is:

1. A jack-up rig unit for offshore use, comprising:

at least one leg with a set of rack teeth fixedly connected thereto and disposed at least generally in a vertical direction along at least a substantial portion of the leg length;

a floatable hull supportable above the water line on said leg(s);

rack chock means carried by said hull for each of said leg(s) for rigidly locking the leg(s) to said hull for rigidification of the hull and leg(s) together without introducing any substantial bending moments in the leg(s), said rack chock means including as a part thereof laterally movable teeth engaging means for rigidly interdigitating with in locking, mating engagement the rack teeth of its respective leg in it rigidification disposition but laterally movable with respect to said rack teeth out of any engagement with said rack teeth when it is desired to jack said leg(s) up and down;

*restraining means for exerting horizontal and vertical components of support on the laterally movable teeth engaging means to retain it in locking engagement with the rack teeth, the vertical components being comprised of a first component directed downwardly toward the laterally movable teeth engaging means and a second component directed upwardly toward the laterally movable teeth engaging means.*

2. The jack-up rig unit of claim 1 wherein said teeth engaging means is also movable in the vertical, longitudinal direction with respect to said rack teeth independent of any hull movement.

3. The jack-up rig unit of claim 2 wherein said teeth engaging means is movably mounted on or above said hull to also allow both horizontal and vertical movement with respect to it, the hull itself being stationary with respect to said leg(s) during the movement of said teeth engaging means.

4. The jack-up rig unit of claim 1 wherein said teeth engaging means comprises a series of matching chock teeth extended into the rack teeth in face-to-face, full line engagement therewith.

5. The jack up rig unit of claim 4 herein said series of chock teeth are mirror images of said rack teeth.

6. The jack-up rig of claim 1 wherein there is included at least three separate legs each having at least one of said rack chock means of each chord of each of said legs.

*7. Jack-up rig unit for offshore use, comprising:*

*at least three separate legs with a set of rack teeth fixedly connected to each leg and disposed at least generally in a vertical direction along at least a substantial portion of the leg length;*

*a floatable hull supportable above the water line of said legs;*

*rack chock means carried by said hull for each of said legs for rigidly locking the legs to said hull for rigidification of the hull and legs together without introducing any substantial bending moments in the legs;* [The jack-up rig of claim 6, wherein]

*each of said legs* [is] *being* of the opposed pinion type, their being at least two of said rack chock means, at least one each for each of the opposed set of rack teeth;

*said rack chock means including as a part thereof laterally movable teeth engaging means for rigidly interdigitating with in locking, mating engagement, the rack teeth of its respective leg, in rigidified disposition, but laterally movable with respect to said rack teeth out of any engagement with said rack teeth where it is desired to jack said legs up and down;*

*a restraining means for exerting horizontal and vertical components of support on the laterally movable teeth engaging means to retain it in locking engagement with the rack teeth, the vertical components being comprised of a first component directed downwardly toward the laterally movable teeth engaging means and a second component directed upwardly toward the laterally movable teeth engaging means.*

8. The jack-up rig of claim 1 wherein said rack chock means is located within the confines of said hull between its bottom and upper deck.

9. The jack-up rig of claim 1, wherein said rack chock means is located above [the] a leg jacking [drives] *drive.*

10. The jack-up rig of claim 6 herein each of said legs is of the single end loaded rack type, having a back plate, and wherein each said rack chock means includes a yoke supporting it on the hull which engages said back plate, the engaging of said teeth engaging means with the rack teeth locking said rack chock means, said yoke and said back plate together.

[11. The method of securing the support leg(s) *of an offshore jack-up rig unit having a hull, legs with rack teeth and a jacking drive associated therewith, comprising the following steps:*

*(a) providing on said hull a separate rack chock means for each of said legs operationally separate and apart from said jacking drive, which rack chock means have, teeth engaging portions which are at least laterally movable with respect to its respective rack teeth and are capable of interdigitating with in locking mating engagement its respective rack teeth;*

*(b) vertically positioning the leg(s)* of the rig with respect to the rig hull to the height desired by means of said jacking drive; and

*(c) after the foregoing steps, laterally moving the teeth engaging portions of each of said rack chock means into locking, mating engagement with its respective rack teeth, and locking all of said rack chock means to said leg(s), to thereby rigidify the rig without relying solely on said jacking drive or any pinion drive or on any associated guidance system for said jacking drive.*]

[12. The method of securing the support leg(s) *of a mobile, offshore, self-elevating type jack-up unit when the leg(s) is in a desired vertical position with respect to the hull structure of the unit, which leg(s) each having at least one set of rack teeth on at least two opposed leg chords, comprising the following steps:*

*(a) providing rack chock means movable both longitudinally and laterally with respect to the rack of the leg(s), which rack chock means has at least one rigid structural element sized and configured to engage at least the upper and lower surfaces of two teeth on said rack;*

*(b) moving said structural element longitudinally with respect to said rack until said structural element is positioned across from two teeth on the said rack and moving said structural element laterally into face-to-face, in-line engagement with the upper and lower surfaces of said two teeth; and*

*(c) rigidly locking said structural element to said rack and and to said hull structure; and*

*(d) repeating steps "a" through "c" for the rack(s) on at least two opposed cords for each leg of the unit to rigidify the leg(s) to the hull structure.*]

[13. The method of claim 12 wherein each of said leg(s) *is of the single end loaded rack types with a back structure at each cord of the leg and wherein said rack chock means includes a yoke supporting structure which supports said rack chock means and which engages said back structure, and wherein thee is included the further step of locking said rack chock means, said yoke and said back structure rigidly together when engaging said rack chock means and said rack.*]

*14. A jack-up rig unit for offshore use, comprising:*

*at least one leg with a set of rack teeth fixedly connected thereto and disposed at least generally in a vertical direction along at least a substantial portion of the leg length;*

*a floatable hull supportable above the water line on said leg(s);*

*rack chock means carried by said hull for each of said leg(s) for rigidly locking the leg(s) to said hull for rigidification of the hull and leg(s) together without introducing any substantial bending moments in the leg(s), said rack chock means including as a part thereof laterally movable teeth engaging means for rigidly interdigitating with in locking, mating engagement, the rack teeth of its respective leg, in rigidified disposition, but laterally movable with respect to said rack teeth out of any engagement with said rack teeth when it is desired to jack said leg(s)* up and down;

*a restraining means for exerting horizontal and vertical components of support on the laterally movable teeth engaging means to retain it in locking engagement with the rack teeth, the vertical components being comprised of a first component directed downwardly toward the laterally movable teeth engaging means and a second component directed upwardly toward the laterally movable teeth engaging means;*

*wherein said teeth engaging means is also movable in the vertical, longitudinal direction with respect to said rack teeth independent of any hull movement;* [The jack-up rig of claim 2] *and* wherein said rack chock means further comprises two mating, inclined surfaces, a back surface and a backing guide surface, relative movement between said mating inclined surfaces causing said teeth engaging means to be simultaneously moved both laterally and longitudinally with respect to said rack teeth.

15. The jack-up unit of claim 4 wherein there are at least three of said chock teeth.

* * * * *